US012794252B2

(12) United States Patent
Wu

(10) Patent No.: US 12,794,252 B2
(45) Date of Patent: Nov. 10, 2026

(54) AUTOMOBILE JUMPSTART ADAPTER INCLUDING SUPERCAPACITORS FOR VOLTAGE CONVERSION IN EMERGENCY START-UP OF VEHICLES

(71) Applicant: Dopollo Innovations, Inc.

(72) Inventor: Jiasheng Wu, Reading, MA (US)

(73) Assignee: Dopollo Innovations, Inc., Reading, MA (US)

( * ) Notice: Subject to any disclaimer, the term of this patent is extended or adjusted under 35 U.S.C. 154(b) by 607 days.

(21) Appl. No.: 18/482,283

(22) Filed: Oct. 6, 2023

(65) Prior Publication Data

US 2024/0039315 A1 Feb. 1, 2024

Related U.S. Application Data

(63) Continuation-in-part of application No. 18/104,544, filed on Feb. 1, 2023, now Pat. No. 12,132,338, which (Continued)

(30) Foreign Application Priority Data

Oct. 9, 2019 (CN) ......................... 201930547185.1
Oct. 22, 2019 (CN) ......................... 201921780240.2

(51) Int. Cl.

*H02J 7/70* (2026.01)
*H01M 10/46* (2006.01)

(Continued)

(52) U.S. Cl.

CPC ............. *H02J 7/751* (2026.01); *H01M 10/46* (2013.01); *H01M 50/20* (2021.01);

(Continued)

(58) Field of Classification Search

CPC .. H02J 7/751; H02J 1/122; H02J 7/342; H02J 7/865; H02J 2207/30; H02J 7/70;

(Continued)

(56) References Cited

U.S. PATENT DOCUMENTS 6,452,362 B1 * 9/2002 Choo ........................ H02J 7/32 320/124
7,301,303 B1 * 11/2007 Hulden ............... H01M 50/202 429/96

(Continued)

FOREIGN PATENT DOCUMENTS

CA 3064303 A1 11/2018
CN 202651833 U 1/2013

(Continued)

OTHER PUBLICATIONS

International Search Report and Written Opinion issued Jan. 27, 2025 in PCT International Patent App. No. PCT/US2024/050005 filed Oct. 4, 2024 (Applicant: Dopollo Innovations, Inc.) (11 pages).

*Primary Examiner* — M Baye Diao
(74) *Attorney, Agent, or Firm* — Polsinelli PC

(57) ABSTRACT

A device may include an enclosure having a shell, a voltage conversion switch on the shell, an input terminal, and a jumpstart output terminal in electrical communication with the input terminal. The device may also include a circuit board disposed within the shell. The circuit board may include an integrated circuit in electrical communication with the voltage conversion switch, two or more supercapacitors in electrical communication with the integrated circuit, two or more relays coupled to the two or more supercapacitors. The integrated circuit may be configured to turn on or turn off the two or more relays to output a first voltage or a second voltage based upon a voltage selection by the voltage conversion switch. The input terminal may be configured to electrically connect to an output terminal of a (Continued)

portable battery. The enclosure may be configured to be attached on one side of the portable battery.

20 Claims, 6 Drawing Sheets

Related U.S. Application Data is a continuation of application No. 16/843,690, filed on Apr. 8, 2020, now Pat. No. 11,637,436.

(51) Int. Cl.
*H01M 50/20* (2021.01)
*H01M 50/543* (2021.01)
*H02J 1/10* (2026.01)
*H02J 7/00* (2026.01)
*H02J 7/34* (2006.01)

(52) U.S. Cl.
CPC ........... *H01M 50/543* (2021.01); *H02J 1/122* (2020.01); *H02J 7/342* (2020.01); *H02J 7/865* (2026.01); *H02J 2207/30* (2020.01)

(58) Field of Classification Search
CPC ........ H02J 7/345; H01M 10/46; H01M 50/20; H01M 50/543
USPC .......................................................... 320/107
See application file for complete search history.

(56) References Cited

U.S. PATENT DOCUMENTS

| | | | | |
|---|---|---|---|---|
| 8,076,900 | B1 | 12/2011 | Brown | |
| 8,235,552 | B1 | 8/2012 | Tsuge | |
| 8,248,035 | B2 * | 8/2012 | Kung | H02J 7/00 320/137 |
| 9,407,102 | B2 * | 8/2016 | Hwang | H02J 7/751 |
| 9,620,989 | B2 * | 4/2017 | Meoli | H01M 10/46 |
| 10,096,996 | B1 | 10/2018 | Lin | |
| 10,305,295 | B2 | 5/2019 | Kelly-Morgan et al. | |
| 10,404,079 | B2 | 9/2019 | Meoli | |
| 10,436,435 | B2 | 10/2019 | Wu | |
| 10,862,176 | B2 * | 12/2020 | Degelau | B25F 5/00 |
| 10,907,603 | B2 * | 2/2021 | Caballero Atienzar | F02N 11/0862 |
| 11,040,633 | B2 * | 6/2021 | Kim | B60L 3/0046 |
| 11,045,572 | B1 * | 6/2021 | Kim | A61L 9/032 |
| 11,114,874 | B2 * | 9/2021 | Lin | B25B 21/00 |
| 11,637,436 | B2 | 4/2023 | Wu | |
| 2006/0097692 | A1 * | 5/2006 | Chen | H02J 7/70 320/107 |
| 2009/0174362 | A1 | 7/2009 | Richardson et al. | |
| 2011/0068734 | A1 | 3/2011 | Waldron | |
| 2012/0256497 | A1 * | 10/2012 | Sung | H01M 10/4257 307/150 |
| 2015/0091392 | A1 | 4/2015 | Hwang | |
| 2016/0243960 | A1 | 8/2016 | Wood | |
| 2018/0102706 | A1 | 4/2018 | Gao et al. | |
| 2018/0294662 | A1 | 10/2018 | Polakowski et al. | |
| 2018/0372054 | A1 | 12/2018 | Chen | |
| 2019/0081472 | A1 | 3/2019 | Guo et al. | |
| 2020/0072177 | A1 | 3/2020 | Clarke et al. | |
| 2020/0127467 | A1 * | 4/2020 | Li | H02J 7/342 |
| 2021/0111574 | A1 | 4/2021 | Wu | |
| 2023/0179006 | A1 | 6/2023 | Wi | |

FOREIGN PATENT DOCUMENTS

| | | | | |
|---|---|---|---|---|
| CN | 11799878 | A | 10/2020 | |
| CN | 114189006 | A | 3/2022 | |
| IE | 20020510 | A1 * | 12/2002 | F02N 11/08 |
| JP | 5204695 | B2 | 6/2013 | |
| WO | 205930421 | U | 2/2017 | |
| WO | 2017167210 | A1 | 10/2017 | |
| WO | 2019143427 | A1 | 7/2019 | |

* cited by examiner

AUTOMOBILE JUMPSTART ADAPTER INCLUDING SUPERCAPACITORS FOR VOLTAGE CONVERSION IN EMERGENCY START-UP OF VEHICLES

CROSS-REFERENCE TO RELATED APPLICATION

This application is a continuation-in-part of U.S. patent application Ser. No. 18/104,544, entitled "Automobile Jumpstart Adapter For An External Battery," filed on Feb. 1, 2023, which is a continuation of U.S. patent application Ser. No. 16/843,690, entitled "Automobile Jumpstart Adapter For An External Battery," filed on Apr. 8, 2020, which claims priorities under 35 U.S.C. § 119(b) from Chinese Patent Application No. 201921780240.2, filed Oct. 22, 2019 and from Chinese Patent Application No. 201930547185.1, filed on Oct. 9, 2019, each of the foregoing applications is incorporated by reference herein in its entirety.

TECHNICAL FIELD

Aspects of the present disclosure relates to the technical field of emergency start-up of automobile devices, and in particular, the present disclosure relates to an automobile start-up adapter or an automobile jumpstart adapter, which includes supercapacitors for charging from a portable battery and discharging to a vehicle battery.

BACKGROUND

The start-up of a typical automobile or an electric vehicle is completed by electricity provided by a vehicle battery (e.g., a car battery, etc.). Often, after the vehicle battery is used for a long time, wear and tear results in the vehicle battery being unable to store and/or provide electricity (e.g., the car battery "dies"), causing the automobile to fail to start normally.

At present, there are two solutions to the above problems. One solution or approach is to jumpstart the dead vehicle battery by connecting the dead vehicle battery to a working battery of another automobile. The approach needs to find an automobile that is nearby and meets electrical connection conditions. The waiting time for a rescuer may be long. Alternatively, a dead vehicle battery may be jumpstarted by a portable emergency start-up power supply, which does not require waiting a long time for rescue. However, the need for emergency start-up power may be infrequent. When the emergency start-up power supply that is carried in the automobile has not been charged within a sufficiently recent timeframe, there may be insufficient stored energy in the portable emergency start-up powder supply so that the emergency start-up power supply cannot be used to start the automobile or the vehicle.

Many households, such as European and American households, maintain a supply of electric tools. An electric tool uses a motor as its power and drives a working head with a power transmission mechanism. Further, in many cases, an appropriate power tool is often kept in a respective family car for emergency needs. At present, rechargeable lithium batteries configured for hand-held power tools have starting voltage of 18 V, 20 V, or 24 V, and the starting voltage of automobiles, such as cars, may be 12 V. As a result, rechargeable lithium batteries for hand-held power tools cannot be directly used for jumpstarting a vehicle. The starting voltage of large vehicles, such as trucks, may be 24 V. However, the large vehicles also require high currents (e.g., greater than 500 amps) for emergency start-up. The rechargeable lithium batteries for hand-held power tools do not provide electric current higher than 500 amps. Thus, the rechargeable lithium batteries for hand-held power tools cannot be directly used for jumpstarting a vehicle.

It is with these observations in mind, among others, that various aspects of the present disclosure were conceived.

BRIEF SUMMARY

In one aspect, a device may include an enclosure having a shell. The device may also include a voltage conversion switch on the shell. The device may also include an input terminal. The device may also include a jumpstart output terminal in electrical communication with the input terminal. The device may also include a circuit board disposed within the shell. The circuit board may include an integrated circuit in electrical communication with the voltage conversion switch. The circuit board may also include two or more supercapacitors in electrical communication with the integrated circuit. The device may also include two or more relays coupled to the two or more supercapacitors. The integrated circuit may be configured to turn on or turn off the two or more relays to output a first voltage or a second voltage different from the first voltage based upon a voltage selection by the voltage conversion switch. The input terminal may be configured to electrically connect to an output terminal of a portable battery. The enclosure may be configured to be attached on one side of the portable battery.

In some aspects, the two or more supercapacitors may be connected in series to output the first voltage. In some aspects, the first voltage may be 24 V.

In some aspects, the two or more supercapacitors may be connected in parallel to output the second voltage. In some aspects, the second voltage may be 12 V.

In some aspects, the circuit board may further include a polarity detection circuit being in electrical communication with the integrated circuit.

In some aspects, the shell may further include a power supply base configured to receive the portable battery, and the input terminal is located on the power supply base.

In some aspects, the circuit board may further include at least one of a short circuit protection circuit, a reverse connection protection circuit, or a reverse charging protection circuit. The reverse connection protection circuit may be connected to a buzzer.

In some aspects, the device may also include a power switch and a power indicator. The power switch and the power indicator may be respectively connected to the circuit board and positioned on the shell.

In some aspects, the device may also include one or more of a Universal Serial Bus (USB) indicator, or a USB switch on the shell.

In some aspects, the device may also include a USB interface being arranged on a single outer side of the shell as the jumpstart output terminal, and a dust cover for shielding the USB interface and the jumpstart output terminal.

In some aspects, the device may also include a locking structure disposed between a power base and the portable battery and configured to secure the shell to the portable battery when the portable battery is electrically connected to the input terminal.

In another aspect, a method is provided for jumpstarting a vehicle. The method may include selecting a voltage from a voltage conversion switch. The method may also include turning on a power switch disposed on a shell of a jumpstart adapter. The jumpstart adapter may include an input terminal, a jumpstart output terminal in electrical communication with the input terminal; and a circuit board disposed within the shell. The circuit board may include an integrated circuit, two or more supercapacitors in electrical communication with the integrated circuit, two or more relays coupled to the two or more supercapacitors and in electrical communication with the integrated circuit. The method may also include charging the two or more supercapacitors by using power from a portable battery; controlling, by the integrated circuit, two or more relays to output a first voltage or a second voltage different from the first voltage based upon a voltage selection by the voltage conversion switch. The method may also include discharging the two or more supercapacitors to power a battery of a vehicle.

In some aspects, controlling two or more relays by the integrated circuit to output one of a first voltage or a second voltage may include connecting the two or more supercapacitors in series to output the first voltage or connecting the two or more supercapacitors in parallel to output the second voltage.

In some aspects, the method may include determining if a polarity of the battery of the vehicle is correct by the polarity detection circuit, if the polarity is correct, attaching the battery of the vehicle to a side of the shell and providing to the battery of the vehicle, through the jumpstart output terminal, the power discharged from the two or more supercapacitors, if the polarity is not correct, no power is discharged to the battery of the vehicle.

In some aspects, the two or more supercapacitors may provide an electric current ranging from about 500 amps to about 2000 amps to the battery of the vehicle.

In some aspects, the method may also include locking the portable battery into the shell; and buzzing a buzzer in response to an incorrectly configured electrical connection between the portable battery and the shell or between the shell and the battery of the vehicle. The buzzer may be connected to one of a short circuit protection circuit, a reverse connection protection circuit, or a reverse charging protection circuit.

In some aspects, the method may also include removing a dust cover that shields a Universal Serial Bus (USB) interface and the jumpstart output terminal on a single outer side of the shell to jumpstart the vehicle. The method may also include powering, through the USB interface, a device using power from the portable battery.

Additional aspects and features are set forth in part in the description that follows, and in part will become apparent to those skilled in the art upon examination of the specification, or may be learned by the practice of the aspects discussed herein. A further understanding of the nature and advantages of certain aspects may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various aspects of the disclosure and should not be construed as a complete recitation of the scope of the disclosure.

DETAILED DESCRIPTION

Figure 1:
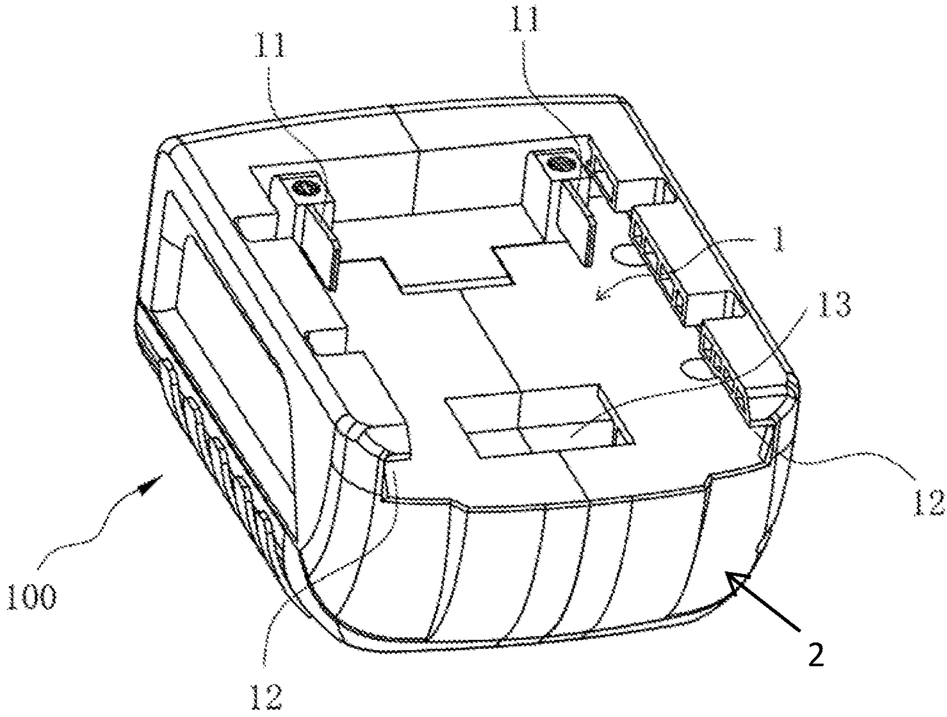
FIG. 1 is a perspective structural view of a first face of a jumpstart adapter, in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described to avoid obscuring the description. References to one or an embodiment in the present disclosure can be references to the same embodiment or any embodiment and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosure includes systems and devices for using a portable battery, such as a lithium battery of a hand-held power tool, to power an automobile or a vehicle for emergency start-up.

In one example, a jumpstart adapter includes a shell and a circuit board provided inside the shell. The jumpstart adapter is provided with an input terminal for electrically connecting with an output terminal of a lithium battery of a power tool and an output terminal for electrically connecting with a clamp. The input terminal and the output terminal are communicated through a circuit board.

In some variations, the circuit board may include a voltage identification circuit identifying an appropriate output voltage corresponding to a battery of an automobile and a voltage conversion circuit converting power from a portable battery to the appropriate output voltage. The circuit board may also include an integrated circuit and a polarity detection circuit being in electrical communication with the integrated circuit. The jumpstart adapter may provide a voltage of 12 V and an electric current of up to 500 amps, which can be used for emergency start-up of a small vehicle, such as a car.

In some variations, the circuit board may include an integrated circuit in electrical communication with the voltage conversion switch. The circuit board may also include two or more supercapacitors in electrical communication with the integrated circuit. The circuit board may also include two or more relays coupled to the two or more supercapacitors. The integrated circuit may be configured to turn on or turn off the two or more relays to output a first voltage or a second voltage different from the first voltage based upon a voltage selection by the voltage conversion switch. The circuit board may also include a polarity detection circuit being in electric communication with the integrated circuit. The jumpstart adapter may provide a voltage of 24 V and an electrical current of about 2000 amps, which can be used for emergency start-up of a large vehicle, such as a truck.

Starting voltage of a consumer vehicle is generally 12 V, and a voltage of a portable battery of a hand-held power tool is generally 18 V, 20 V, or 24 V. In some examples, the portable battery is a lithium battery (e.g., Hitachi®, Dewalt®, Milwaukee®, Makita®, RIDGID®, Kobalt®, Worx®, Craftsman®, Hilti®, Metabo®, Black & Decker®, etc. brand lithium batteries for power tools) The output terminal of the portable battery can be electrically connected with the input terminal of the jumpstart adapter. The voltage of the connected portable battery may be converted into an appropriate starting voltage (e.g., 12 V) via a circuit board including a voltage identification circuit and a voltage conversion circuit for a small vehicle that requires a starting voltage of about 12 V. The voltage of the connected portable battery may also be converted into an appropriate starting voltage (e.g., 24 V) via a circuit board including supercapacitors for a large vehicle that requires a starting voltage of about 24 V or for a small vehicle that requires a starting voltage of about 12 V. The converted power from the portable battery then outputs to the vehicle through a clamp attached to the output terminal of the jumpstart adapter to supply power for the emergency start-up of the vehicle.

Thus, the jumpstart adapter can be used to convert power from portable batteries of commonly used hand-held electric tools to an appropriate voltage for emergency start-up of a vehicle with a dead battery or low power. As a result, the vehicle can be jumpstarted without finding and waiting for other vehicles, or spending a long time waiting for a rescuer.

The jumpstart adapter includes a shell that is provided with a power supply base for a plug-in setting of the portable battery. The jumpstart adapter also includes an input terminal that is arranged in the power supply base to facilitate the electrical connection between the input terminal and an output terminal of the portable battery.

A locking structure may be included between the shell and the portable battery to secure the portable battery in place during jumpstarts and to further secure the connection between the battery and the power socket.

In some examples, the locking structure may be disposed between the power supply base of the shell and the portable battery, to make the overall appearance of the portable battery and the jumpstart adapter more aesthetically pleasing.

In particular, the locking structure may include convex ribs and grooves. The convex ribs may be provided on either a power socket of the shell or the portable battery, while the grooves may be correspondingly provided in the other of the power socket of the shell or the portable battery. When the output terminal of the portable battery is electrically connected to the input terminal of the jumpstart adapter, the convex ribs (of the portable battery or the power socket) are inserted into the grooves (of the power socket or the portable battery, respectively).

In some examples, there may be two grooves respectively provided on two sides of the power socket. Likewise, there may be two ribs provided on two sides of the portable battery in a one-to-one correspondence with the grooves. When the output terminal of the portable battery is electrically connected with the input terminal of the jumpstart adapter, the matching designs of the ribs and grooves can restrict movement of the portable battery with respect to vertical directions and/or horizontal directions relative to the power supply base of the shell. In at least one example, the two convex ribs may be provided on both sides of the portable battery, and the two grooves may be provided on both sides of the power socket.

In some examples, the locking structure may further include a notch and an elastic clamping block. The notch may be provided in either the bottom of the power supply base or the portable battery, while the elastic clamping block may be respectively provided in the other of the bottom of the power supply base or the portable battery. When the output terminal of the portable battery is electrically connected with the input terminal of the jumpstart adapter, the elastic clamping block may be inserted into the notch. When the output terminal of the portable battery is electrically connected with the input terminal of the jumpstart adapter, the elastic clamping block and the notch together limit forward and backward movement of the portable battery relative to the power supply base.

To safely jumpstart the vehicle, at least one of a short circuit protection circuit, a reverse connection protection circuit, or a reverse charging protection circuit may be provided on the circuit board or in the clamping block. Additionally, in some examples, a buzzer may be provided on the circuit board and configured to respond (e.g., buzz) to the reverse connection protection circuit.

In some examples, the jumpstart adapter may also include a power switch and/or a power indicator, which are in communication with the circuit board to facilitate control of the emergency start-up power supply of the vehicle.

Further, the jumpstart adapter may be provided with a USB interface, a USB indicator and a USB switch which communicate with the circuit board. The USB interface and the output terminal of the jumpstart adapter may be disposed on the same side of the shell. The jumpstart adapter may be provided with a dust cover for shielding the USB interface and the output terminal. The USB interface can facilitate supply of power to smart terminal devices, such as, mobile phones and tablet computers, among others. The dust cover can prevent dust from entering the USB interface and the output terminals.

In general, the output terminal of the portable battery (e.g., of a hand-held power tool) may be electrically connected to the input terminal of the jumpstart adapter, and the voltage of the portable battery is converted into an appropriate starting voltage required by an automobile being jumpstarted. The voltage conversion can be accomplished through a voltage recognition or identification circuit and a voltage conversion circuit. The portable battery may be electrically connected to the output terminal of the jumpstart adapter through the voltage recognition or identification circuit and the voltage conversion circuit. A clamp may be applied to the output terminal of the jumpstart adapter to power the start-up of the automobile (e.g., where the car battery may be dead or have low power, etc.). The power socket of the shell may be shaped to facilitate the electrical connection between the output terminal of the jumpstart adapter and the input terminal of the portable battery. The corresponding locking structure secures and improves the electrical connection between the portable battery and the power socket.

As a result, the portable battery can supply power for an emergency start-up of the automobile. Additionally, the emergency start-up power supply may be safe by equipping the jumpstart adapter with a variety of protection circuits. The jumpstart adapter can be used to manually provide the emergency start-up power supply for the automobile in need of power supply, and supply power for intelligent terminal equipment.

FIGS. 1-7 depict various embodiments of the technology disclosed above. It is understood that the embodiments depicted in the figures are presented for purposes of understanding and explanation and not to be taken as unduly limiting. Variations on the systems, methods, and devices disclosed herein may be implemented (e.g., in altered order, with additional or fewer steps, of modified shape, form, or configuration, etc.) without departing from the spirit and scope of the disclosure.

Figure 2:
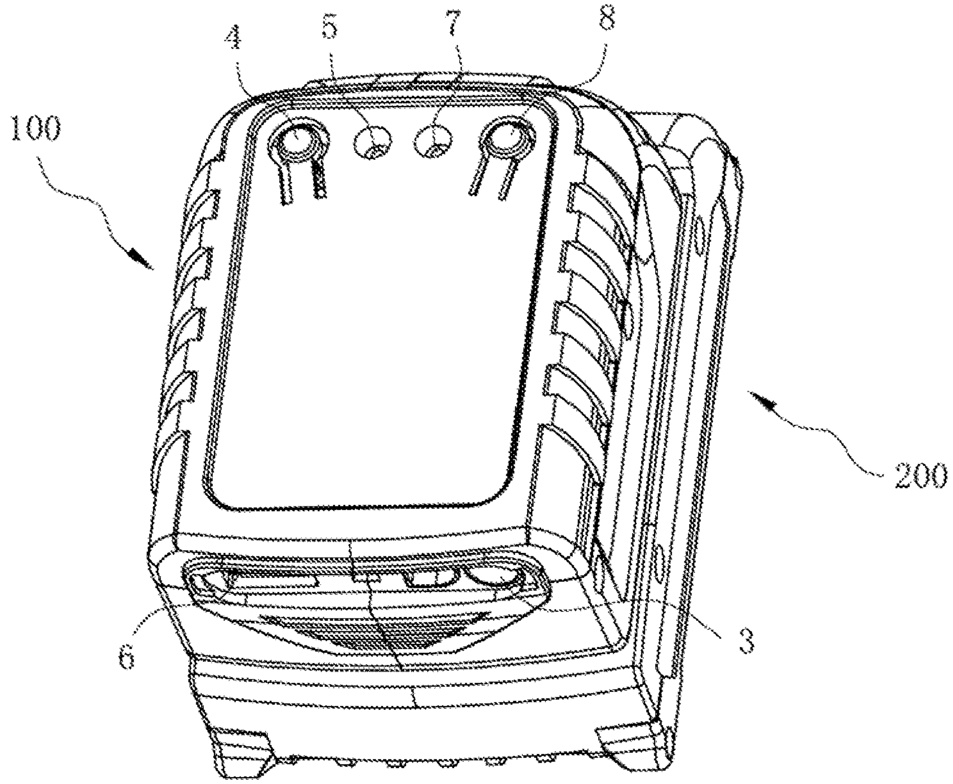
FIG. 2 is a perspective structural view of a second face of a jumpstart adapter, in accordance with some aspects of the present technology.
Figure 3:
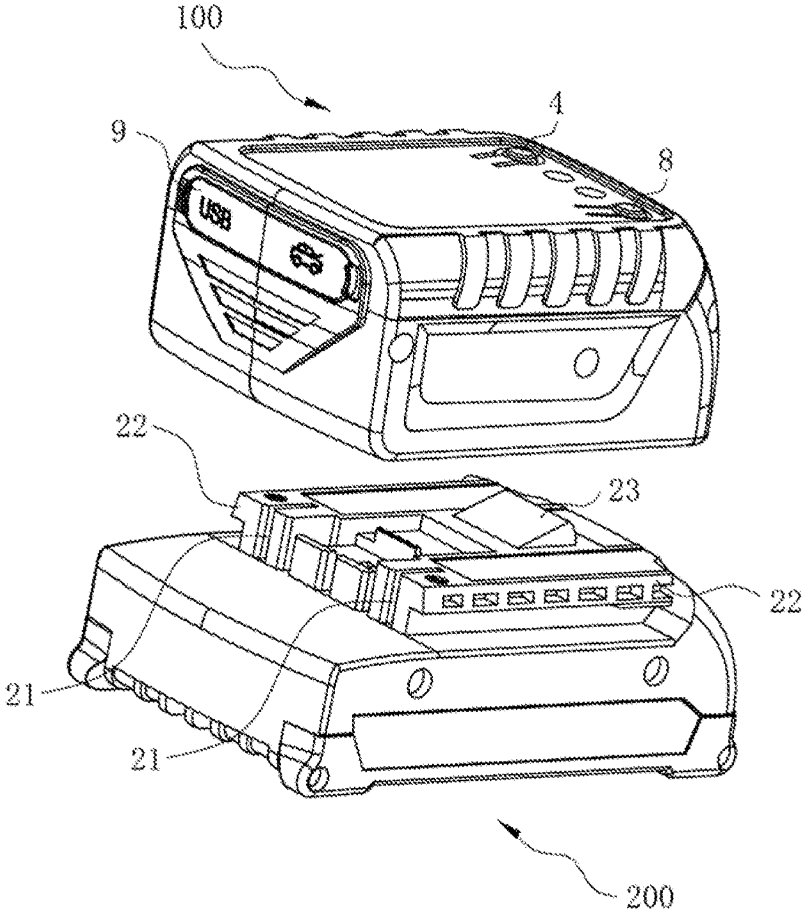
FIG. 3 is a partially exploded view of the jumpstart adapter of FIG. 2, in accordance with some aspects of the present technology.
Figure 4:
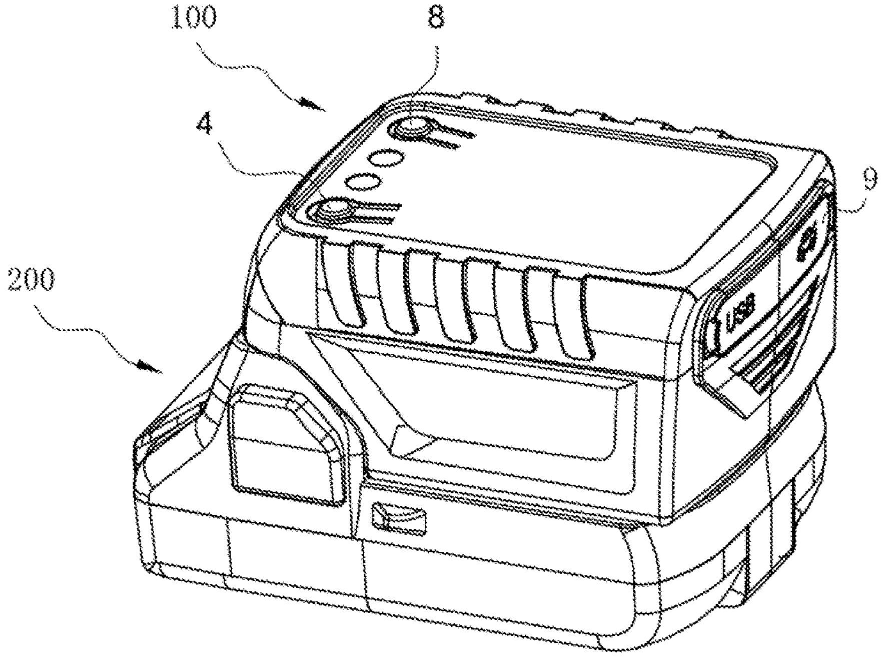
FIG. 4 illustrates a jumpstart adapter in configuration for jumpstarting a vehicle, in accordance with some aspects of the present technology.
Figure 5:
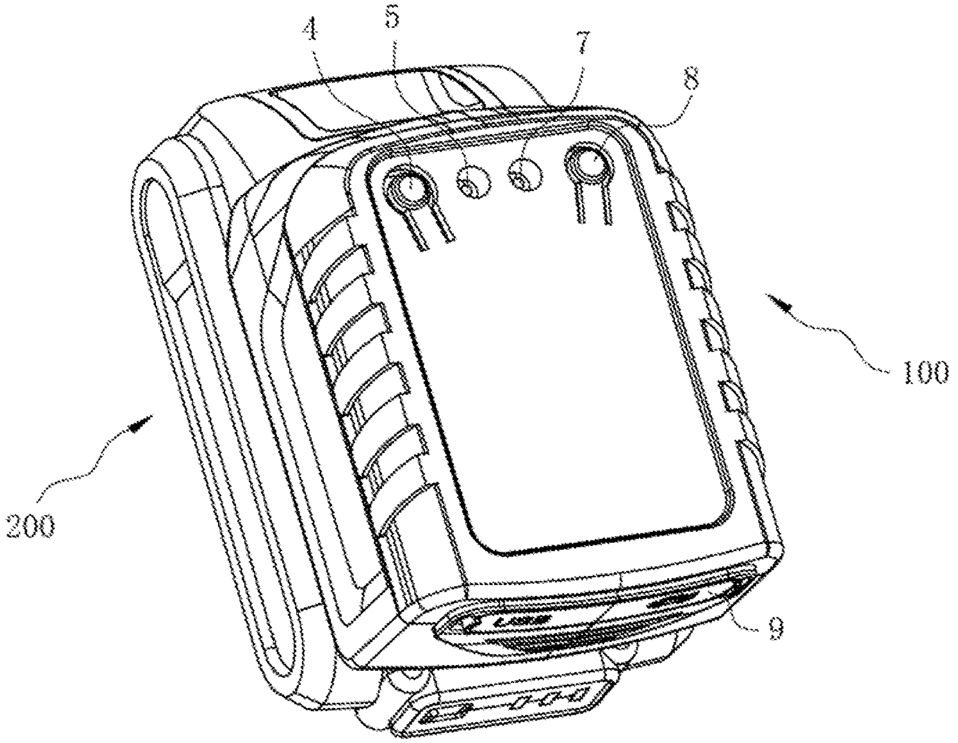
FIG. 5 is a perspective structural view of a jumpstart adapter in configuration for jumpstarting a vehicle, in accordance with some aspects of the present technology.
Figure 6:
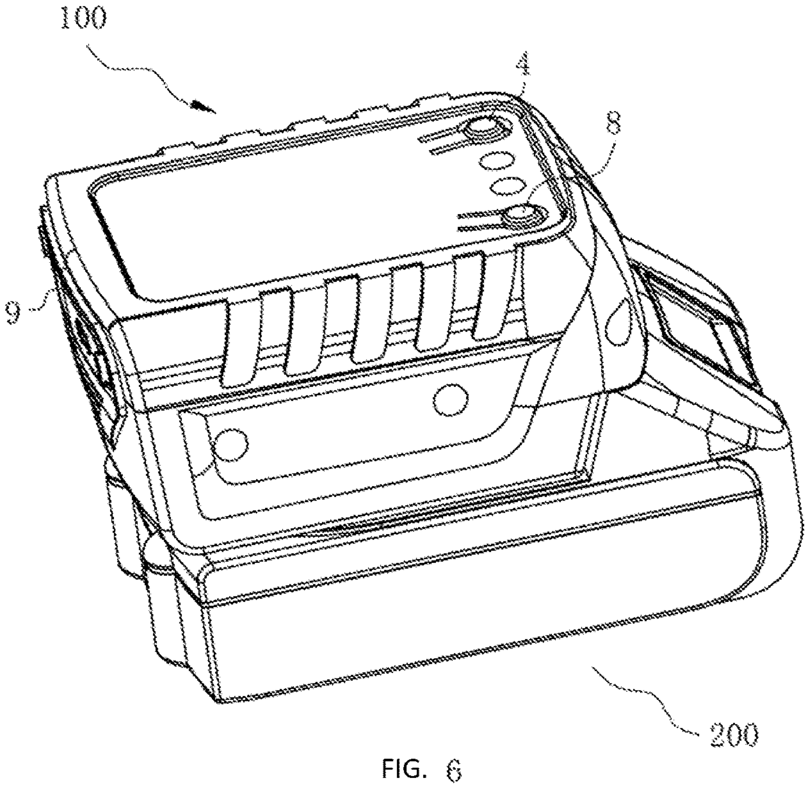
FIG. 6 is a profile structural view of a jumpstart adapter in configuration for jumpstarting a vehicle, in accordance with some aspects of the present technology.
Figure 7:
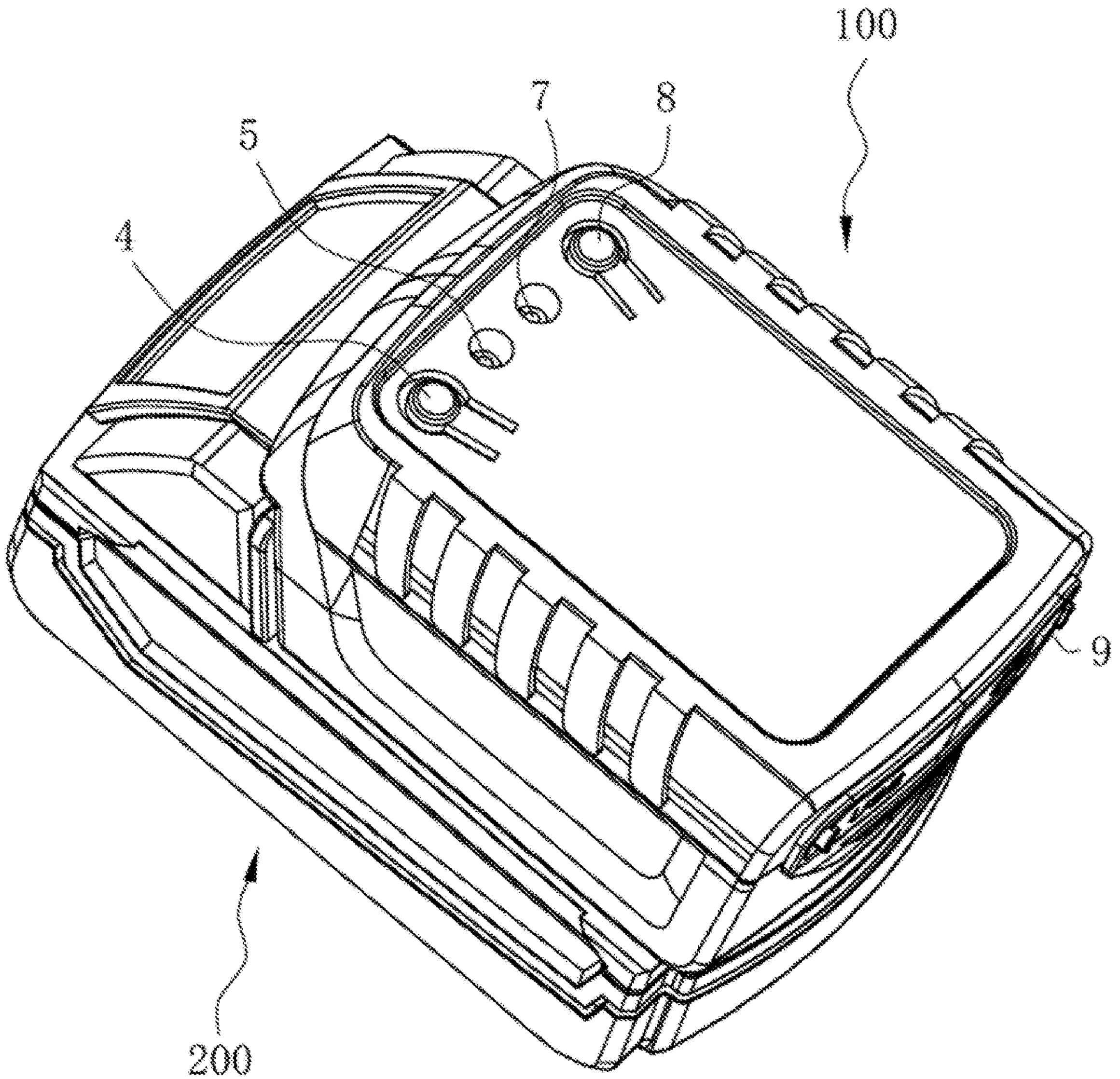
FIG. 7 is a second perspective structural view of a jumpstart adapter in configuration for jumpstarting a vehicle, in accordance with some aspects of the present technology.

FIG. 1 illustrates a perspective view showing inside of an automobile jumpstart adapter. FIG. 2 illustrates a perspective view of an automobile jumpstart adapter in configuration for jumpstarting a vehicle. FIG. 3 illustrates a perspective view showing outside of the automobile jumpstart adapter of FIG. 1 and a perspective view of a portable battery before being configured for jumpstarting a vehicle. FIGS. 4-7 illustrate various perspective views of an automobile jumpstart adapter in configuration for jumpstarting a vehicle.

Referring to FIG. 1 now, an automobile jumpstart adapter 100 includes an enclosure having a shell 2. The enclosure is configured to be attached on one side of a portable battery 200. The shell 2 is provided with a power socket 1, which is also referred to as a power supply base 1. The power socket 1 is used for plugging in a portable battery 200, such as a portable battery 200. The jumpstart adapter 100 is provided with an input terminal 11. The jumpstart adapter 100 is also provided with an output terminal 3, as shown in FIG. 2.

In FIGS. 2 and 4-6, a portable battery 200, such as a lithium battery, of a power tool is attached to the jumpstart adapter 100. The input terminal 11, when the portable battery 200 is attached to the jumpstart adapter 100, is electrically connected to an output terminal 21 of the portable battery 200 as shown in FIG. 3. The output terminal 3 may be electrically connected to a wire clamp (not depicted). Wire clamps are well known in the art and most wire clamps can be used.

Figure 8:
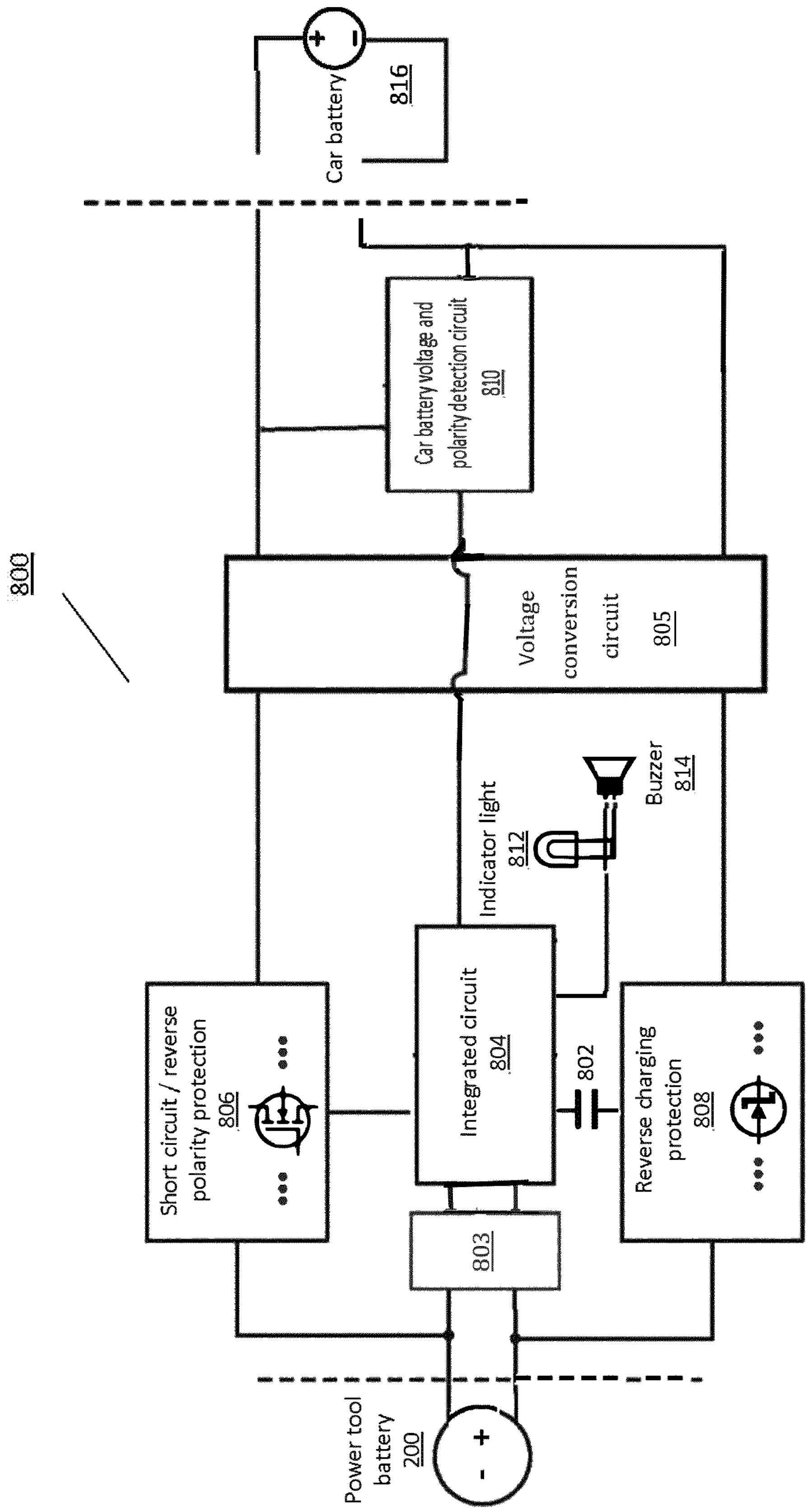
FIG. 8 is a diagram showing an exemplary circuit used to implement the disclosed technology for jumpstart of a car, in accordance with some aspects of the present technology.
Figure 9:
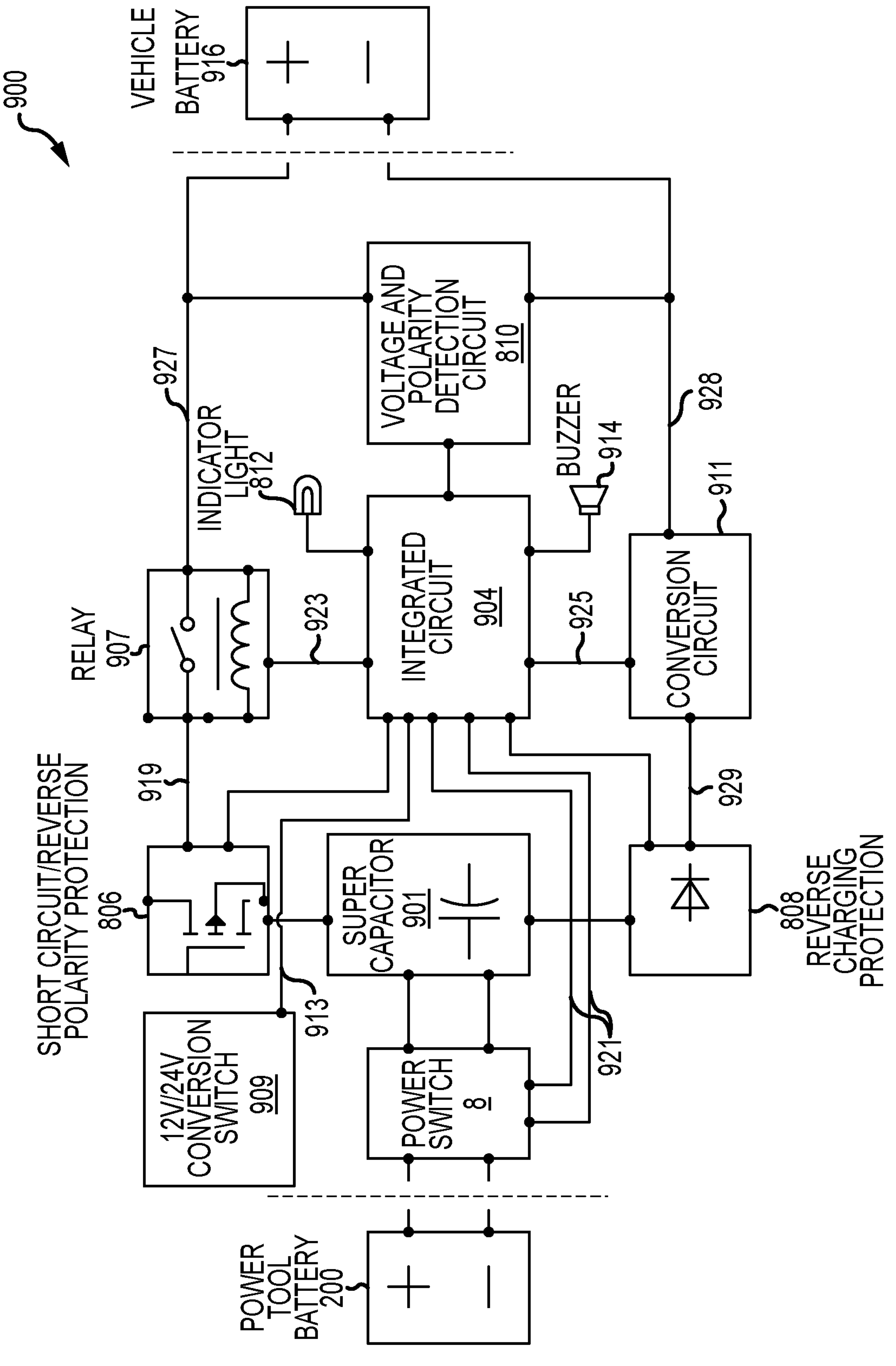
FIG. 9 is a diagram showing an exemplary circuit including supercapacitors and relays to implement the disclosed technology for emergency start-up of a large vehicle requesting a voltage of 24 V or a small vehicle requesting a voltage of 12 V, in accordance with some aspects of the present technology.

The input terminal 11 and the output terminal 3 are communicatively and conductively coupled through a circuit board 800 or a circuit board 900 provided in the jumpstart adapter 100. FIGS. 8 and 9 illustrate the circuit board 800 and 900, respectively.

In one example, the circuit board 800 may include a voltage identification circuit and a voltage conversion circuit 805 for starting a small vehicle, such as a car, which requires a starting voltage of 12 V.

In another example, the circuit board 900 includes supercapacitors, but does not include a voltage conversion circuit. The circuit board 900 can be used for both large vehicles which require a starting voltage of 24 V and small vehicles which require a starting voltage of 12 V.

For emergency start-up of a vehicle, the portable battery 200 can be plugged into the power socket 1, and the output terminal 21 of the portable battery 200 can be electrically connected to the input terminal 11 of the jumpstart adapter 100. The voltage of the portable battery 200 can be converted into the starting voltage required by the automobile through a voltage identification circuit and a voltage conversion circuit, where the vehicle requires a starting voltage of 12 V. The power is supplied for the emergency start-up of the vehicle through the output of a wire clamp electrically connected to the output terminal 3 of the jumpstart adapter 100.

As shown in FIGS. 1 and 3, a locking structure is provided between the jumpstart adapter 100 and the portable battery 200 to make the connection between the power socket 1 and the portable battery 200 more firm. Furthermore, the locking structure is disposed between the power supply base 1 and the portable battery 200. In particular, the locking structure includes grooves 12 as shown in FIG. 1, provided on opposed sides of the power supply base 1, and convex ribs 22 as shown in FIG. 3, provided on opposed sides of the portable battery 200.

The convex ribs 22 and the grooves 12 are arranged one by one correspondingly. The locking structure further includes a notch 13 as shown in FIG. 1, provided on the bottom of the power supply base 1 or the side of the power supply base 1 including the input terminal 11, and an elastic clamping block 23 (as shown in FIG. 3) provided on the portable battery 200. When the portable battery 200 is inserted in the power socket 1 and the output terminal 21 of the portable battery 200 is electrically connected with the input terminal 11, the convex ribs 22 are correspondingly inserted into the grooves 12 and the elastic clamping block 23 is inserted into the notch 13.

Further, a short circuit protection circuit 806, a reverse connection protection circuit 806 (which is also referred to as a reverse polarity protection circuit 806), and a reverse charge protection circuit 808 are provided on the circuit board 800 or 900 and/or in the clamp. In some examples, the circuit board 800 or 900 is also provided with a buzzer 814 configured to respond to the reverse connection protection circuit. Here, the short circuit protection circuit, the reverse connection protection circuit, and the reverse charge protection circuit are all provided on the circuit board 800 or 900.

The jumpstart adapter 100 is provided with a power switch 8, a power indicator 7, a USB interface 6, a USB indicator 5, a USB switch 4, as shown in FIG. 2 and FIGS. 3-7. The power switch 8 and the power indicator 7 are connected to the circuit board 800 or 900 to provide direct user control of the emergency start-up power supply of the vehicle. The jumpstart adapter 100 also includes the USB interface 6, the USB indicator 5 and the USB switch 4, which are each connected to the circuit board 800 or 900 to facilitate powering and/or charging of smart terminal devices, such as, for example and without imputing limitation, mobile phones, tablet computers, and the like.

The jumpstart adapter 100 is provided with a dust cover 9, as shown in FIG. 3. To prevent dust from entering the USB interface 6 and the output terminal 3, the USB interface 6 and the output terminal 3 may be disposed on the same side of the jumpstart adapter 100. The jumpstart adapter 100 may be provided dust cover 9, which is a dust-proof cover for shielding the USB interface 6 and the output terminal 3, among other components of the jumpstart adapter 100.

To use the jumpstart adapter 100, the portable battery 200 is plugged into the power socket 1 or power supply base 1 of the jumpstart adapter 100 to electrically connect the output terminal 21 of the portable battery 200 to the input terminal 11. The dust cover 9 is then opened and an input terminal of the clamp is connected to the output terminal 3, which is put in conductively coupled to an output terminal of the clamp and, accordingly, the vehicle battery. In this process, the rib 22 is inserted into the groove 12, and the elastic clamping block 23 is inserted into the notch 13 to prevent the portable battery 200 from coming out of the power socket 1.

When the power switch 8 is pressed, the power tool battery 200 can provide the power to the circuit board 800 including the integrated circuit 804. The voltage of the portable battery 200 can be identified through the voltage identification circuit 803, and the voltage of the portable battery 200 is converted into the appropriate voltage of the vehicle battery through the voltage conversion circuit 805. The converted voltage is output through the output terminal 3 of the jumpstart adapter 100 to supply power for the starting motor of the vehicle. In this process, when the output terminal of the clamp is electrically connected to the positive and negative poles of the car battery 816 correctly, the reverse connection protection circuit 806 controls the circuit board to output the current. Additionally, the reverse connection protection circuit 806 may alert the user that the attempted configuration is incorrect through the power indicator light 7 and a buzzer 814. If positive and negative poles of the clamp are electrically connected incorrectly, the short circuit protection circuit 806 controls the circuit board 800 to stop outputting current and protect the portable battery 200 from being damaged. Further, after the vehicle is started, the reverse charge protection circuit 808 can prevent the high current generated by the vehicle engine from being reversely charged into the portable battery 200.

FIG. 8 is a diagram showing an example circuit used to implement the disclosed technology for jumpstart of a car. A circuit board 800 can be powered by the portable battery 200, and may include a switch 802, a short circuit or reverse polarity protection circuit 806, an integrated circuit 804, a voltage identification circuit 803, a voltage conversion circuit 805, a reverse charging protection circuit 808, an indicator light 812, a buzzer 814, and a voltage and polarity detection circuit 810, which are coupled together and in communication as illustrated in FIG. 8.

The reverse charging protection circuit 808 may include high-power diodes such that the current can only flow in one direction, which can prevent reverse charging of the generator current after the car starts.

When the circuit board 800 is connected to the portable battery 200, a switch 802 turns on, then the indicator light 812 flashes red and green and enters the standby state.

The voltage and polarity detection circuit 810 can detect the polarity of the car battery 816 after the jumpstart adapter 100 is connected to the car battery 816. If the polarity of the car battery 816 is correct, the integrated circuit 804 turns on the indicator light 812 according to a computer program, and turns on the short circuit/reverse polarity protection circuit 806 and reverse charging protection circuit 808 to begin a power output.

If the voltage and polarity detection circuit 810 detects a polarity error, such as a reverse circuit or a short circuit, then the indicator light 812 lights up red and the buzzer 814 sounds an alarm, and the short circuit/reverse polarity protection circuit 806 and reverse charging protection circuit 808 remain off. In this case, the circuit board 800 does not output power to the car battery 816.

The jumpstart adapter 100 may include a circuit board 900 that replaces the circuit board 800. The circuit board 900 is an improvement to the circuit board 800 as shown in FIG. 8. The circuit board 800 can directly start the car battery 816, but its maximum output current was about 500 amps, which cannot start large vehicles.

However, the circuit board 900 uses supercapacitors that allow fast charging and discharging in high currents, such as an output current of 500 amps or more, for example, 2000 amps, among others. The circuit board 900 can also output a voltage of about 24 V to the vehicle battery 916. Thus, the jumpstart adapter 100 including the circuit board 900 can provide emergency start-up for large vehicles, such as trucks, among others. The jumpstart adapter 100 may include a voltage conversion switch 909, e.g., a 12V/24V conversion switch 909 that is positioned on the shell 2 and allows a user to manually select an output voltage, for example, 24 V or 12 V. For example, the 12V/24V conversion switch 909 can switch between 12 V and 24 V by selecting 12 V or 24 V. As such, the jumpstart adapter 100 can be used for both larger vehicles and small vehicles.

FIG. 9 is a diagram showing an exemplary circuit including supercapacitors and relays to implement the disclosed technology for emergency start-up of large vehicles and small vehicles, in accordance with some aspects of the present technology. The circuit board 900 includes two or more supercapacitors 901, which can be used for energy storage undergoing frequent charge or discharge cycles at high currents in short durations. The supercapacitors 901 function on electrostatic principles with no chemical reactions, and thus do not have the lifetime issues associated with chemical storage of batteries and have high cycling durability. Also, the supercapacitors 901 may discharge more frequently than a battery. The supercapacitors 901 can be connected in series to increase voltages.

The circuit board 900 also includes a voltage conversion circuit 911 or a 12V/24V conversion circuit for conversion between a first voltage (e.g., 24 V) and a second voltage (e.g., 12 V). The voltage conversion circuit 911 is in electrical communication with the integrated circuit 904 via connection 925. The 12V/24V conversion circuit 911 is also in electrical communication with supercapacitors 901 via connections 929, and 931. After the 12V/24V conversion circuit 909 selects a voltage, the integrated circuit 904 receives a signal of the selection from the 12V/24V conversion circuit 909 via connection 913. Then, the integrated circuit 904 can automatically control the supercapacitors 901 to connect in series or in parallel via the 12V/24V conversion circuit 911.

The circuit board 900 also includes relay 907 which is an electrically operated switch that open and close the circuit by receiving an electrical signal from the integrated circuit 904. The relay 907 can control discharging of the supercapacitor. The relay 907 may be connected to the integrated circuit 904 via connection 923. The relay 907 can be turned on by the integrated circuit 904 after the supercapacitors 901 complete charging.

The voltage conversion circuit 911 also includes a relay (not shown), which can be turned on by the integrated circuit 904 to control the power discharged to the vehicle battery 916. After the relay 907 turns on and the relay in the voltage conversion circuit 911 is controlled properly by the integrated circuit 904 (e.g., turned or turned off), the power from the supercapacitor 901 can be discharged or outputted to the vehicle battery 916.

In one example, when relay 907 is turned on and the relay in the voltage or 12V/24V conversion circuit 911 is also turned on by the integrated circuit 904, the output voltage from the supercapacitors 901, via connections 919, and 927, connections 929 and 928, and the voltage conversion circuit 911 including the relay that connects to the vehicle battery 916 via connection 928, is a first voltage, such as 24 V.

In another example, when only relay 907 is turned on while the relay in the 12V/24V conversion circuit 911 is turned off, the output voltage from the supercapacitors 901, via connection 919, relay 907, and connection 927, is a second voltage, such as 12 V, which is half of the first voltage The integrated circuit 904 is in electrical communication with supercapacitors 901 via the 12V/24V conversion circuit 911. Thus, the integrated circuit 904 can control the supercapacitors 901 to connect in series or in parallel via the 12V/24V conversion circuit 911.

In one example, when the two supercapacitors 901 are configured to connect in series, the two supercapacitors 901 provide a first output voltage, such as 24 V.

In another example, when the two supercapacitors 901 are configured to connect in parallel, the two supercapacitors 901 provide a second output voltage, such as 12 V.

The 12V/24V conversion switch 909 connects to integrated circuit 904 via connection 913. The integrated circuit 904 receives a signal from the 12V/24V conversion switch 909. Based on the signal, the integrated circuit 904 can automatically control configuration of the supercapacitors in series or in parallel and can control charging the supercapacitors 901 via conversion circuit 911.

For example, the integrated circuit 903 may automatically select a first starting voltage or a second starting voltage via selection from the 12V/24V conversion switch 909. The first starting voltage is different from the second starting voltage. For instance, the first starting voltage may be 12 V, while the second starting voltage may be 24 V. When the 12V/24V conversion switch 909 selects a voltage of 12 V, the two supercapacitors are configured to be in parallel. When the 12V/24V conversion switch 909 selects 24 V, the two supercapacitors 901 are configured to be in series.

The power switch 8 is connected to the integrated circuit 904 via connections 921. The integrated circuit 904 controls the relay 907 on or off via connection 923. The integrated circuit 904 also controls the relay in the 12V/24V conversion circuit 911.

The circuit board 900 allows emergency start-up for a large vehicle which has a starting voltage of 24 V or a small vehicle which has a starting voltage of 12 V. Assume that each of the two supercapacitors 901 has a voltage of 12 V when fully charged. When the user wants to start a large vehicle that requires a starting voltage of 24 V, the user can manually set the 12V/24V conversion switch 909 to 24 V, which results two supercapacitors 901 to connect in series, and thus changes the output voltage received by vehicle battery 916 from 12 V to 24 V.

In one example, when a user needs to start a large vehicle, such as a truck, which requires a starting voltage of 24 V, the user can connect the power tool battery 200 to jumpstart adapter 100, may manually use the 12V/24V conversion switch 909 to select an output voltage, e.g., about 24 V. Then, the user can quickly charge the supercapacitors 901 with the power tool battery 200. When charging the supercapacitors 901 is completed, the integrated circuit 904 may receive a signal from the supercapacitors 901 that indicates that the charging is completed and can automatically turn on relay 907 and the relay in 12V/24V conversion circuit 911 to generate the starting voltage of 24 V and to output the electric current (e.g., greater than 500 amps) to start the large vehicle. The positive and negative poles of the vehicle battery 916 can be detected by using the car battery voltage and polarity detection circuit 910.

In another example, when a user needs to start a small vehicle, such as a car, which requires a starting voltage of 12 V, the user can connect the portable battery or power tool battery 200 to the jumpstart adapter 100, may manually use the 12V/24V conversion switch 809 to select an output voltage of about 12 V. Then, the user can quickly charge the supercapacitors 901 with the power tool battery 200. When charging the supercapacitors 901 is completed, the integrated circuit 904 may receive a signal from the supercapacitors 901 that indicates that the charging is completed and can automatically turn on relay 907 and a relay in 12V/24V conversion circuit 911 to output the electric current to start the small vehicle. When the relay 907 is turned on only while a relay in 12V/24V conversion circuit 911 is turned off, only a half of the supercapacitors 901 is used to generate the starting voltage of 12 V and to output the electric current of about 500 amps to start the small vehicle.

The circuit board 900 may also include a short circuit or reverse polarity protection circuit 806, a reverse charging protection circuit 808, a voltage and polarity detection circuit 810, which have similar functions to the circuit board 800.

In some variations, the electric current discharged from the supercapacitors may be equal to or greater than 500 amps. In some variations, the electric current discharged from the supercapacitors may be equal to or greater than 600 amps. In some variations, the electric current discharged from the supercapacitors may be equal to or greater than 700 amps. In some variations, the electric current discharged from the supercapacitors may be equal to or greater than 800 amps. In some variations, the electric current discharged from the supercapacitors may be equal to or greater than 900 amps. In some variations, the electric current discharged from the supercapacitors may be equal to or greater than 1000 amps.

In some variations, the electric current discharged from the supercapacitors may be equal to or greater than 1100 amps. In some variations, the electric current discharged from the supercapacitors may be equal to or greater than 1200 amps. In some variations, the electric current discharged from the supercapacitors may be equal to or greater than 1300 amps. In some variations, the electric current discharged from the supercapacitors may be equal to or greater than 1400 amps. In some variations, the electric current discharged from the supercapacitors may be equal to or greater than 1500 amps. In some variations, the electric current discharged from the supercapacitors may be equal to or greater than 1600 amps. In some variations, the electric current discharged from the supercapacitors may be equal to or greater than 1700 amps. In some variations, the electric current discharged from the supercapacitors may be equal to or greater than 1800 amps. In some variations, the electric current discharged from the supercapacitors may be equal to or greater than 1900 amps. In some variations, the electric current discharged from the supercapacitors may be equal to or greater than 2000 amps.

Statement 1: A device comprises: an enclosure having a shell; a voltage conversion switch on the shell; an input terminal; a jumpstart output terminal in electrical communication with the input terminal; and a circuit board disposed within the shell, wherein the circuit board comprises: an integrated circuit in electrical communication with the voltage conversion switch; two or more supercapacitors in electrical communication with the integrated circuit; two or more relays coupled to the two or more supercapacitors, the integrated circuit is configured to turn on or turn off the two or more relays to output a first voltage or a second voltage different from the first voltage based upon a voltage selection by the voltage conversion switch, wherein the input terminal is configured to electrically connect to an output terminal of a portable battery, wherein the enclosure is configured to be attached on one side of the portable battery.

Statement 2: The device of statement 1, wherein the two or more supercapacitors are connected in series to output the first voltage.

Statement 3: The device of statement 2, wherein the first voltage is 24 V.

Statement 4: The device of statement 1, wherein the two or more supercapacitors are connected in parallel to output the second voltage.

Statement 5: The device of statement 4, wherein the second voltage is 12 V.

Statement 6: The device of statement 1, wherein the circuit board further comprises a polarity detection circuit being in electrical communication with the integrated circuit.

Statement 7: The device of statement 1, wherein the shell further comprises a power supply base configured to receive the portable battery, and the input terminal is located on the power supply base.

Statement 8: The device of statement 1, wherein the circuit board further comprises at least one of a short circuit protection circuit, a reverse connection protection circuit, or a reverse charging protection circuit, and wherein the reverse connection protection circuit is connected to a buzzer.

Statement 9: The device of statement 1, further comprising a power switch and a power indicator, the power switch and the power indicator respectively connected to the circuit board and positioned on the shell.

Statement 10: The device of statement 1, further comprising one or more of a Universal Serial Bus (USB) indicator, or a USB switch on the shell.

Statement 11: The device of statement 1, further comprising a USB interface being arranged on a single outer side of the shell as the jumpstart output terminal, and a dust cover for shielding the USB interface and the jumpstart output terminal.

Statement 12: The device of statement 1, further comprising a locking structure disposed between a power base and the portable battery and configured to secure the shell to the portable battery when the portable battery is electrically connected to the input terminal.

Statement 13: A method for jumpstarting a vehicle, the method comprising: selecting a voltage from a voltage conversion switch; turning on a power switch disposed on a shell of a jumpstart adapter, wherein the jumpstart adapter comprises an input terminal, a jumpstart output terminal in electrical communication with the input terminal; and a circuit board disposed within the shell, wherein the circuit board comprises: an integrated circuit, two or more supercapacitors in electrical communication with the integrated circuit, two or more relays coupled to the two or more supercapacitors and in electrical communication with the integrated circuit; charging the two or more supercapacitors by using power from a portable battery; controlling, by the integrated circuit, two or more relays to output a first voltage or a second voltage different from the first voltage based upon a voltage selection by the voltage conversion switch; and discharging the two or more supercapacitors to power a battery of a vehicle.

Statement 14: The method of statement 13, wherein the controlling two or more relays by the integrated circuit to output one of a first voltage or a second voltage comprises connecting the two or more supercapacitors in series to output the first voltage or connecting the two or more supercapacitors in parallel to output the second voltage.

Statement 15: The method of statement 14, wherein the first voltage is 24 V, and the second voltage is 12 V.

Statement 16: The method of statement 13, wherein the circuit board further comprises a polarity detection circuit being in electrical communication with the integrated circuit.

Statement 17: The method of statement 16, further comprising: determining if a polarity of the battery of the vehicle is correct by the polarity detection circuit, if the polarity is correct, attaching the battery of the vehicle to a side of the shell and providing to the battery of the vehicle, through the jumpstart output terminal, the power discharged from the two or more supercapacitors, if the polarity is not correct, no power is discharged to the battery of the vehicle.

Statement 18: The method of statement 13, wherein the two or more supercapacitors provide an electric current ranging from about 300 amps to about 2000 amps.

Statement 19: The method of statement 13, further comprising locking the portable battery into the shell; and buzzing a buzzer in response to an incorrectly configured electrical connection between the portable battery and the shell or between the shell and the battery of the vehicle, wherein the buzzer is connected to one of a short circuit protection circuit, a reverse connection protection circuit, or a reverse charging protection circuit.

Statement 20: The method of statement 13, further comprising removing a dust cover that shields a Universal Serial Bus (USB) interface and the jumpstart output terminal on a single outer side of the shell to jumpstart the vehicle; and powering, through the USB interface, a device using power from the portable battery.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B Having described several aspects, it will be recognized by those skilled in the art that various modifications, alternative constructions, and equivalents may be used without departing from the spirit of the disclosure. Additionally, a number of well-known processes and elements have not been described to avoid unnecessarily obscuring the aspects disclosed herein. Accordingly, the above description should not be taken as limiting the scope of the document.

Those skilled in the art will appreciate that the presently disclosed aspects teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system, which, as a matter of language, might be said to fall there between.

What is claimed is:

1. A device comprises:

an enclosure having a shell;

a voltage conversion switch on the shell;

an input terminal;

a jumpstart output terminal in electrical communication with the input terminal; and a circuit board disposed within the shell, wherein the circuit board comprises:

an integrated circuit in electrical communication with the voltage conversion switch;

two or more supercapacitors in electrical communication with the integrated circuit;

two or more relays coupled to the two or more supercapacitors, the integrated circuit is configured to turn on or turn off the two or more relays to output a first voltage or a second voltage different from the first voltage based upon a voltage selection by the voltage conversion switch, wherein the input terminal is configured to electrically connect to an output terminal of a portable battery, wherein the enclosure is configured to be attached on one side of the portable battery.

2. The device of claim 1, wherein the two or more supercapacitors are connected in series to output the first voltage.

3. The device of claim 2, wherein the first voltage is 24 V.

4. The device of claim 1, wherein the two or more supercapacitors are connected in parallel to output the second voltage.

5. The device of claim 4, wherein the second voltage is 12 V.

6. The device of claim 1, wherein the circuit board further comprises a polarity detection circuit being in electrical communication with the integrated circuit.

7. The device of claim 1, wherein the shell further comprises a power supply base configured to receive the portable battery, and the input terminal is located on the power supply base.

8. The device of claim 1, wherein the circuit board further comprises at least one of a short circuit protection circuit, a reverse connection protection circuit, or a reverse charging protection circuit, and wherein the reverse connection protection circuit is connected to a buzzer.

9. The device of claim 1, further comprising a power switch and a power indicator, the power switch and the power indicator respectively connected to the circuit board and positioned on the shell.

10. The device of claim 1, further comprising one or more of a Universal Serial Bus (USB) indicator, or a USB switch on the shell.

11. The device of claim 1, further comprising a USB interface being arranged on a single outer side of the shell as the jumpstart output terminal, and a dust cover for shielding the USB interface and the jumpstart output terminal.

12. The device of claim 1, further comprising a locking structure disposed between a power base and the portable battery and configured to secure the shell to the portable battery when the portable battery is electrically connected to the input terminal.

13. A method for jumpstarting a vehicle, the method comprising:

selecting a voltage from a voltage conversion switch;

turning on a power switch disposed on a shell of an enclosure of a jumpstart adapter, wherein the jumpstart adapter comprises an input terminal, a jumpstart output terminal in electrical communication with the input terminal; and a circuit board disposed within the shell, wherein the circuit board comprises:

an integrated circuit, two or more supercapacitors in electrical communication with the integrated circuit, two or more relays coupled to the two or more supercapacitors and in electrical communication with the integrated circuit;

charging the two or more supercapacitors by using power from a portable battery wherein the enclosure is configured to be attached on one side of the portable battery;

controlling, by the integrated circuit, two or more relays to output a first voltage or a second voltage different from the first voltage based upon a voltage selection by the voltage conversion switch; and discharging the two or more supercapacitors to power a battery of a vehicle.

14. The method of claim 13, wherein the controlling two or more relays by the integrated circuit to output one of a first voltage or a second voltage comprises connecting the two or more supercapacitors in series to output the first voltage or connecting the two or more supercapacitors in parallel to output the second voltage.

15. The method of claim 14, wherein the first voltage is 24 V, and the second voltage is 12 V.

16. The method of claim 13, wherein the circuit board further comprises a polarity detection circuit being in electrical communication with the integrated circuit.

17. The method of claim 16, further comprising:

determining if a polarity of the battery of the vehicle is correct by the polarity detection circuit, if the polarity is correct, attaching the battery of the vehicle to a side of the shell and providing to the battery of the vehicle, through the jumpstart output terminal, the power discharged from the two or more supercapacitors, if the polarity is not correct, no power is discharged to the battery of the vehicle.

18. The method of claim 13, wherein the two or more supercapacitors provide an electric current ranging from about 300 amps to about 2000 amps.

19. The method of claim 13, further comprising locking the portable battery into the shell; and buzzing a buzzer in response to an incorrectly configured electrical connection between the portable battery and the shell or between the shell and the battery of the vehicle, wherein the buzzer is connected to one of a short circuit protection circuit, a reverse connection protection circuit, or a reverse charging protection circuit.

20. The method of claim 13, further comprising removing a dust cover that shields a Universal Serial Bus (USB) interface and the jumpstart output terminal on a single outer side of the shell to jumpstart the vehicle; and powering, through the USB interface, a device using power from the portable battery.

* * * * *